A. Bayley,
Washstand,
No. 55,982. Patented July 3, 1866.
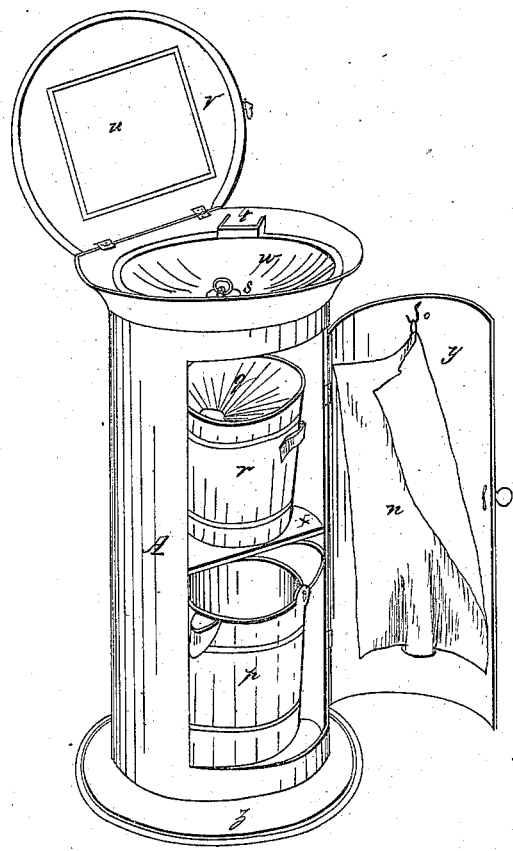
Witnesses.
Wm M Gooding
Edward Collver
Inventor.
Alfred Bayley

UNITED STATES PATENT OFFICE.

ALFRED BAYLEY, OF NEWARK, NEW JERSEY.

IMPROVEMENT IN WASH-STANDS.

Specification forming part of Letters Patent No. 55,982, dated July 3, 1866.

*To all whom it may concern:*

Be it known that I, ALFRED BAYLEY, of the city of Newark, in the county of Essex and State of New Jersey, have invented certain Improvements in Portable Wash-Stands; and I do hereby declare the following to be a full and exact description of the same, reference being herein had to the drawings that accompany this specification and make part of the same.

The nature of my improvement consists in the production of a light metallic casing inclosing the necessities and conveniences of a portable wash-stand, so compact as to occupy but little room, while neat to the eye in an office or a boudoir.

A case, of tin, iron, or other metal, A, is formed with a molding base, $z$, a door, $y$, a shelf in the interior, $x$, a wash-bowl, $w$, either loose and fitting in or fast to and forming part of the top, and a tight-fitting lid, $v$.

In the lid $v$ is a looking-glass, $u$. In the side of the wash-bowl $w$ is a soap-box, $t$. In the bottom of the wash-bowl is a plug and aperture, $s$, which when open allows the contents of the wash-bowl to descend into the receptacle $r$, which stands on the shelf $x$. In the upper part of this receptacle is a flat funnel, $q$, to prevent splashing over the sides of the receiver. Below is a vessel, $p$, holding a supply of clean water. On the door $y$ is a hook, $o$, to receive the loop of the towel $n$.

I claim—

As a new article of manufacture, a portable metallic wash-stand constructed and its parts arranged substantially as described.

ALFRED BAYLEY.

Witnesses:
W. M. GOODING,
EDWARD COLLVER.